United States Patent [19]

Vadseth et al.

[11] Patent Number: 4,798,168
[45] Date of Patent: Jan. 17, 1989

[54] ARRANGEMENT FOR FARMING OF FISH, SHELLFISH AND OTHER MARINE BEINGS

[76] Inventors: Ragnar Vadseth, Gartnervn. 43, 3478 Naersnes; Arne Vadseth, Vardevn. 26, 3470 Slemmestad, both of Norway

[21] Appl. No.: 22,714

[22] Filed: Mar. 5, 1987

[51] Int. Cl.⁴ .............................................. A01K 63/04
[52] U.S. Cl. ...................................................... 119/3
[58] Field of Search .................................... 119/3, 4, 5

[56] References Cited

U.S. PATENT DOCUMENTS

| | | | |
|---|---|---|---|
| 3,116,712 | 1/1964 | Ogden et al. | 119/3 |
| 3,653,358 | 4/1972 | Fremont | 119/3 |
| 3,716,025 | 2/1973 | Lawson | 119/3 |
| 4,044,720 | 8/1977 | Fast | 119/3 |
| 4,141,318 | 2/1979 | MacVane et al. | 119/3 |
| 4,422,408 | 12/1983 | Pohlhausen | 119/3 |
| 4,711,199 | 12/1987 | Nyman | 119/3 |

Primary Examiner—Robert P. Swiatek
Attorney, Agent, or Firm—Laff, Whitesel, Conte & Saret

[57] ABSTRACT

Arrangement for enhanced farming of fish and other similar species, comprising a formed enclosure such as a bag having preferably circular cross-section submerged in water with an upper edge of the bag defining an opening at the water surface and fastened to floats or disposed in a land base arrangement. The cloth of the bag is preferably watertight, and a hose and pump arrangement is provided to suction water from a depth having a favorable water temperature, and expel the water within the bag via of an outlet at the water surface, the outlet being oriented tangential to the horizontal cross-section of the bag.

6 Claims, 1 Drawing Sheet

U.S. Patent     Jan. 17, 1989     4,798,168

ARRANGEMENT FOR FARMING OF FISH, SHELLFISH AND OTHER MARINE BEINGS

BACKGROUND OF THE INVENTION

This invention relates to an arrangement for farming fish, shell fish and other marine beings, and more particularly to a formed enclosure such as a bag of preferably circular cross-section in the horizontal plane, which is submerged into surrounding water with an open edge of the bag supported at the water Prior art arrangements for fish farming can be two categories: open water-based enclosures, and closed land-based plants. Open enclosures are used mostly for farming consumer fish while land-based plants are filled with fresh water and are used mostly for farming fry. Open water enclosures are far less expensive than land-based plants, and are also cheaper to operate since the land-based plants typically require large, costly and power consuming pumps for conveying water into an on-shore basin.

Prior art open water enclosures are typically formed from bags comprised of net cloth which are submerged in the ocean. Natural water currents cause the water within the bags to circulate. Open water enclosures are very popular in Norway since the Gulf Stream carries relatively warm water up along the coast in the western and northern part of the country, and relatively strong tides provide sufficient current to facilitate constant circulation of water.

One disadvantage of prior art open enclosures is that the farmed fish are subject to contamination by contagious matter and parasites which may be carried by the circulating water. Another disadvantage is that the net cloth has a tendency to become clogged over time, thus requiring frequent cleaning. In order to clean the cloth, the fish are emptied and the cloth is hoisted above the water and manually scrubbed. It has been discovered that this time consuming net cleaning procedure is responsible for a major portion of the expenses incurred in the operation of prior art open enclosure fish farming installations.

An additional disadvantage of open water enclosures is that it is difficult to adjust and control the water temperature, which typically conforms to the ambient temperature of the water surrounding and infiltrating the bag. Hence, open water enclosures cannot be used in coastal districts where the water is too cold during the winter, or where the surface water is contaminated or contains damaging algae or similar matter. Nor can such prior art open water enclosures be used in districts where the surface water is too warm.

Furthermore, it has been found that fish excrement and unconsumed food particles tend to fall to the bottom of the net where they decay, causing bubbles of $H_2S$ and methane gas to rise within the nets. These gases are very harmful to the farmed fish and may in some cases cause death.

There have been instances reported of large schools of jelly fish carried by natural currents, becoming entangled in the nets and causing the farmed fish to suffocate due to a lack of circulated fresh water.

In the event that fish farmed by means of an open water enclosure become infected with disease or parasites, the disease can spread quickly to neighboring enclosures which are usually placed relatively close by. Administering medicine to the farmed fish in such prior art open water enclosures has also been found to be problematic since the medicine dissipates and washes away quickly as a result of the natural water currents.

SUMMARY OF THE INVENTION

It is an object of the present invention to provide an open water enclosure designed to maximize the yield of farmed fish or other marine animals.

A further object of the invention is to provide an open water enclosure which can be used in areas where the surface water is either too cold or too warm during particular seasons of the year, or where the surface water contains matter damaging to the fish.

Yet another object of the present invention is to provide means in an open water enclosure to effectively administer medicine to the farmed fish and to shorten the working time required to periodically clean the enclosure.

According to the present invention, there is provided a fish farming arrangement characterized by a water-tight enclosure, such as a bag, in combination with. a pump and hose for drawing water from a depth at which the water temperature is favorable for fish farming, and introducing the water through an upper edge of the side wall of the bag, tangential to the side wall in relation to the horizontal cross-section of the bag.

A further characteristic of the present invention is that the side walls of the bag are kept above the water surface, and an overflow hose is provided in the centre of the bag extending slightly above the water surface.

According to a further aspect of the invention, the pump includes apparatus for adding air and/or oxygen to the water being drawn through the hose.

According to a preferred embodiment of the invention, the hose is comprised of a vertically oriented pipe, and a plurality of small openings are provided in the pipe at a distance of approximately 3 meters below water level for blowing air or oxygen into the pipe in the form of a stream of small air bubbles. The lower part of the pipe is made flexible, and the upper portion of the pipe bends toward the outlet which extends substantially horizontally through the bag and tangentially to the side wall of the bag.

According to a successful prototype of the invention, a roof or cover of light impervious material such as black plastic cloth, is provided over the upper edge of the bag, in order that at least the surface water is kept dark. The bag wall is preferably made translucent in a lower submerged portion thereof to allow light to pass therethrough.

A number of advantages are obtained over prior art open water enclosures through use of the arrangement according to the present invention. By virtue of the dense watertight construction of the bag and use of a water pump and flexible hose, the temperature and circulation of water can be accurately controlled within the enclosure. In particular, water can be supplied to the enclosure from a depth where the temperature is most favorable. Thus, for sea-based enclosures which are used in countries having very cold winters (e.g. Norway), where the water at the surface level during the winter is typically so cold as to kill the fish on contact, the arrangement of the present invention can be used to draw water into the bag from a depth of, for instance, 20 to 30 meters where the temperature may vary from 5° C. to 7° C., even in the middle of winter.

By using a pump according to the arrangement of the present invention, air or oxygen enriched water may be fed continuously to the inner part of the enclosure.

One special advantage of the fish farming arrangement according to the present invention over that of the prior art, is the provision of a constant circulating current within the watertight bag enclosure. It has been found that the fish within the bag will position themselves against the current so as to remain parallel with one another, all heading in the same direction, and thereby arranging themselves in a school formation. In the school formation, the fish can swim tightly together without stress.

By way of contrast, in prior art open water enclosures, the fish swim in all directions during periods when there is no current. As a result, the fish become aggressive, and attack one another as a result of lack of space. This phenomenon is known as eyebiting, and imposes a strict limit to the amount of fish that can be accommodated within such conventional installations.

Fish farmed in the arrangement according to the present invention gain weight and strength at a faster rate than those farmed in prior art open water enclosures, as a result of being provided with constant curent, favorable temperature and a rich addition of air and/or oxygen.

Furthermore, better utilization of the feed is provided than in prior art open water enclosures since the circulating current keeps the feed floating for a long period of time during which it can be eaten.

Fish raised according to the arrangement of the present invention are also characterized by a low frequency of disease since the fish are isolated from contagious matter in the surrounding waters. Medicine can be administered in a controlled manner, minimizing the amount used since the medicine is not carried out of the enclosure by water currents, as in the prior art. Furthermore, any sick fish in a particular farming installation will not infect the fish in adjacent enclosures.

The watertight bag used in the arrangement of the present invention can be simply replaced in the event of excessive shell growth, etc., or alternatively the fish can be emptied from the bag and the bag can be cleaned.

Still further objects and advantages of the invention will become readily apparent to those skilled in the art to which the invention pertains upon reference to the following detailed description.

DESCRIPTION OF THE DRAWINGS

The description refers to the accompanying drawings in which like reference characters refer to like parts throughout the several views, and in which.

DESCRIPTION OF THE PREFERRED EMBODIMENT

Figure 1:
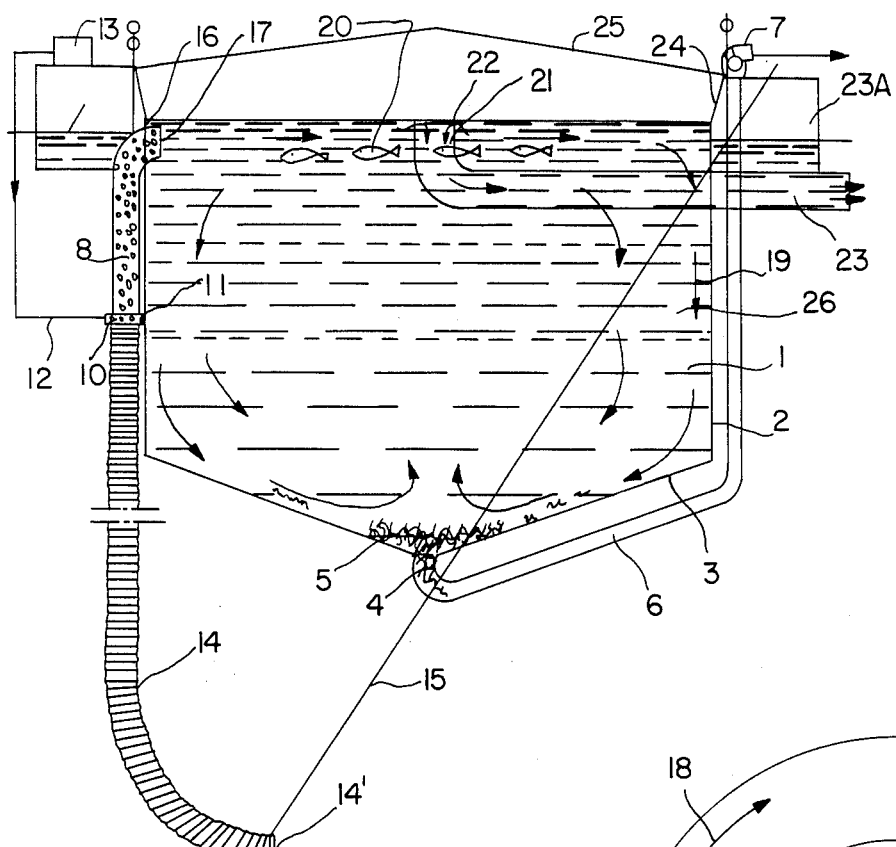
FIG. 1 shows a fish farming arrangement according to the present invention shown from the side, FIG. 2 hows the arrangement of FIG. 1 from above.

Referring to FIG. 1, a sea based fish farming enclosure is illustrated comprising a bag 1 submerged in water such as in a fjord, lake or ocean, etc. The side walls 2 and bottom 3 of the bag 1 are comprised of watertight material, such as plastic. The bottom 3 is shaped in the form of a funnel, and terminates in an outlet 4 for receiving matter 5 collected at the very bottom of the bag. The outlet 4 receives the matter 5 which is conveyed through a pipe or hose 6 by means of a pump 7, to a place of deposit, or cleaning station for dirt.

A further pump 13 is connected to a vertical pipe 8 which is provided at a predetermined depth (e.g. 3 meters under the water surfaced) with a diffuser 10 comprised of a plurality of small openings 11. Air and-/or oxygen are pumped through a line 12 to the diffuser 10. The pump 13 can be any form of inexpensive low pressure pump.

A flexible suction pipe or hose 14 is fastened to the end of the pipe 8, and can be formed of, for instance, corregated plastic pipe. Flexibility in the hose 14 results in the ability to direct the inlet 14' of the pipe to any required depth within the water by means of a string or cord 15 fastened from the end of the pipe up to the water surface.

The pipe 8 is provided with a deflection of bend at 16 leading to the inside of the side wall 2 of the bag 1.

Figure 2:
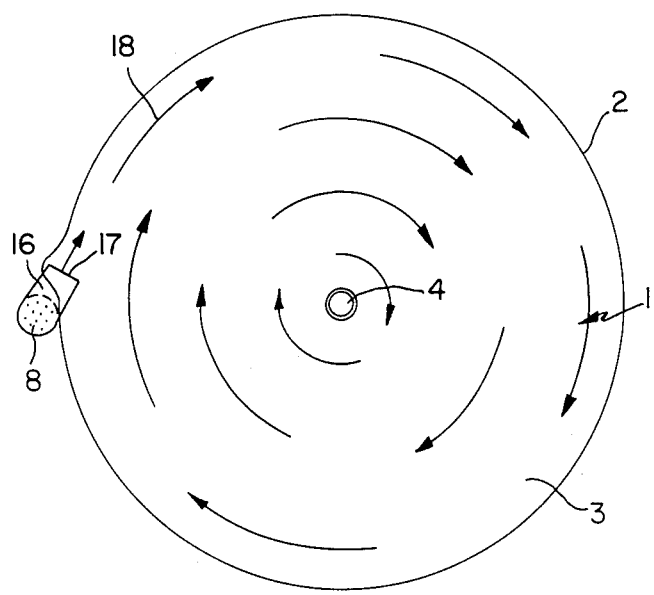

As seen from FIG. 2, the outlet 17 from the pipe bend 16 is made tangential to the side wall 2. When air is blown into the pipe 8 through the diffuser openings 11, the air bubbles draw the water upwardly through the pipe and into the bag 1, resulting in a circulating current, as shown by the direction of arrows 18. The current moves in a spiral toward the center of the bag, and at the same time downwardly along the side walls, as shown by the direction of arrows 19 in FIG. 1.

As discussed above, this current results in the fish assuming a tight school formation against the current.

Also, feed is carried with the current and circulates around the bag and is kept afloat for a long time.

Fish excrement and unconsumed food particles eventually travel along the wall 2 of the bag in the direction of the current 19, and are collected at the bottom 5 and removed via the outlet 4.

In the center of the bag 1 is an overflow pipe 21 (not shown in FIG. 2) having an edge 22 extending slightly above the water surface. Thus, a somewhat higher water level is maintained inside the enclosure than outside, which serves two purposes. Firstly, water which overflows into the pipe 21 spills through the outlet 23 into the surrounding water by means of gravity. This overflowing water is typically quite clean, since excrement and food particles travel to the bottom of the bag. If required, outlet 23 can be connected to a cleaning station, etc. Secondly, a small difference in the water level between the inside and the outside of the bag 1 results in the bag stretching in such a way that it is kept tight, thereby resisting deformation of the walls due to currents in the surrounding water.

The entire arrangement is supported by floats 23A, or alternatively may be supported by a land based arrangement, such as an outrigger, etc. A fence 24 is fastened to the upper edge of the side wall 2, for preventing fish from leaping over the edge. A roof or cover 25 of preferably opaque material, such as plastic cloth, is stretched over the entire arrangement, and can be supported by means of light air pressure within the bag (i.e. above the water level). The roof is tightly connected to the fence 24 by means of appropriate airtight sealing material. A portion 26 of the bag shown between the dashed lines in FIG. 1 forms a window and is fabricated from translucent material through which light is allowed to penetrate. The preferred arrangement of an opaque roof and a translucent lower portion of the bag has been found to result in increased fish yield.

According to the arrangement of the present invention, as illustrated in FIGS. 1 and 2, a complete closed system is provided in which the environment inside the enclosure can be accurately controlled. By use of the pump 13, the system can be operated year round with favorable water temperatures. The fish are less agressive as a result of the constant current. Thus, increased utilization of the fish farming arrangement and better economy are provided over prior art open water enclosures, yielding a greater amount of larger and healthier fish. Greater efficiency in feed utilization and low frequency of disease is obtained due to constant circulation of fresh water and a plentiful supply of air or oxygen.

As a result of using watertight or liquid impervious material in forming the bag 1, poisonous planctum algae are prevented from entering, and bacteria is prevented from spreading to neighboring fish farming works. Also, medicine introduced within the bag can be retained therein by simply shutting off the pump 13.

Contamination of the sea floor is substantially prevented as a result of excrement and unconsumed food particles being removed at the bottom of the bag by means of the pipe 4 in combination with pump 7. Hence, the incidence of rising $H_2S$ and methane gases formed by rotting excrement and feed at the bottom, is substantially prevented.

As discussed above, the bag may be disposed of or cleaned in the event of excessive shell growth, etc. A preferred manner of exchanging a new bag for an old bag is to thread the new bag outside the old one and fasten it to the floats 23A, and thereafter cut loose the old bag from the fastenings and remove the bag while simultaneously allowing the fish to spill into the new bag.

Figure 3:
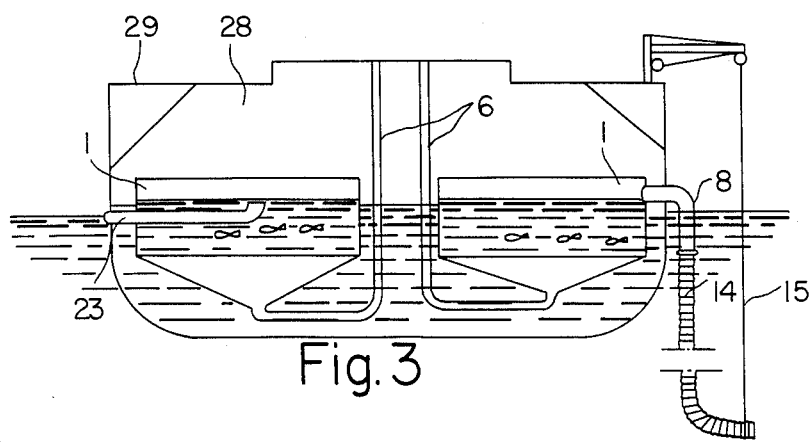
FIG. 3 is a side view of an alternative embodiment of the fish farming arrangement according to the present invention.

With reference to FIG. 3, an alternative embodiment is shown wherein a plurality of fish farming works 1 are submerged in water within the cargo hold or tank 28 of a floating vessel 29. Such a vessel may be for instance, a retired tanker or other combined vessel such as an obo-ship having open holds without cumbersome bulk heads. Water is drawn through the pipe 8 and flexible hose 14 from a suitable depth in the surrounding sea as discussed above with reference to FIG. 1, and circulates within each of the farming bags 1 as discussed above with reference to FIG. 2. An outlet 23 passes through the side of the vessel 29 and out into the surrounding water, for overflow. The suction line 6 is connected to the bottom of each of the bags 1 for pumping dirt and excrement to on board cleaning stations (not shown).

By using such an alternative embodiment, the farming of fish may be pursued at locations where it would otherwise be prohibited, such as in narrow fjords where there is the hazard of water pollution. By utilizing the arrangement according to the present invention, the fish farming proprietor has full control over pollution to the surrounding waters since the effluent can, if necessary, be purified.

The alternative embodiment has been found to be advantageous since retired vessels are quickly sold at scrap iron prices on the world market, and can be sold after some years of use for fish farming, at practically the same price.

A person skilled in the art may conceive of other embodiments or variations of the present invention without departing from the sphere and scope as defined by the claims appended hereto.

I claim:

1. A fish farming arrangement comprised of a liquid impervious enclosure for containing marine life, said enclosure being submerged in surrounding water, means attached to a curved side wall of said enclosure for supporting said enclosure submerged within the surrounding water, and means for pumping water at a predetermined depth from said surrounding water into an upper portion of said enclosure tangentially to said curved side wall and in a horizontal plane, such that within said enclosure a constant circulating current is maintained against which said fish swim and position themselves in parallel formation, said means for pumping water being comprised of a pump connected to a vertically-oriented hose having an inlet in a flexible end in said surrounding water and an outlet connected to said side wall, and a diffuser for injecting one or both of air and oxygen into water flowing within said hose, and further comprised of means disposed at the bottom of said enclosure for collecting debris and pumping said debris to a cleaning station for purification.

2. The arrangement according to claim 1, wherein said means for pumping is further comprised of a substantially vertical pipe connecting said hose to said outlet and said pump via said diffuser, said diffuser being provided with apertures for injecting a stream of small air bubbles into the water flowing through said hose.

3. The arrangement according to claim 2, comprised of a plurality of said enclosures submerged in water within a cargo hold of a floating vessel, wherein water is pumped from outside the vessel and overflow means are provided for dumping water outside the vessel via gravity feed.

4. The arrangement according to claim 1, further including a cover of opaque material connected to and supported above said upper portion of the enclosure and traslucent means for transmitting light through a predetermined portion of said side wall below water level.

5. The arrangement according to claim 4, wherein said opaque cover is comprised of a black plastic sheet.

6. The arrangement according to claim 1, wherein said outlet is connected tangentially to said side wall of the enclosure in an approximately horizontal plane.

* * * * *